United States Patent
Petrosyan

(10) Patent No.: US 10,658,842 B2
(45) Date of Patent: May 19, 2020

(54) ASSEMBLY, SYSTEM AND METHOD FOR DISTRIBUTING, MONITORING, AND CONTROLLING ELECTRICAL POWER

(71) Applicant: Ara Petrosyan, Van Nuys, CA (US)

(72) Inventor: Ara Petrosyan, Van Nuys, CA (US)

(*) Notice: Subject to any disclaimer, the term of this patent is extended or adjusted under 35 U.S.C. 154(b) by 390 days.

(21) Appl. No.: 15/583,833

(22) Filed: May 1, 2017

(65) Prior Publication Data

US 2018/0316192 A1 Nov. 1, 2018

(51) Int. Cl.
| | |
|---|---|
| *H02J 1/00* | (2006.01) |
| *H02J 3/00* | (2006.01) |
| *H02J 3/38* | (2006.01) |
| *H02S 40/30* | (2014.01) |
| *H02S 40/38* | (2014.01) |
| *H02S 50/00* | (2014.01) |
| *H02S 40/32* | (2014.01) |
| *H02J 3/32* | (2006.01) |
| *H02J 7/35* | (2006.01) |

(52) U.S. Cl.
CPC ............. *H02J 3/383* (2013.01); *H02J 3/32* (2013.01); *H02J 7/35* (2013.01); *H02S 40/30* (2014.12); *H02S 40/32* (2014.12); *H02S 40/38* (2014.12); *H02S 50/00* (2013.01)

(58) Field of Classification Search
CPC ... H02S 40/38; H02J 3/383; H02J 9/04; H02J 7/35; H02J 3/32; H02J 7/0022; Y02B 10/72; Y02E 10/563; Y02E 10/566
See application file for complete search history.

(56) References Cited

U.S. PATENT DOCUMENTS

| | | | | |
|---|---|---|---|---|
| 8,410,633 | B2* | 4/2013 | Batzler | H02J 3/14 307/39 |
| 9,190,836 | B2* | 11/2015 | Dent | G01R 31/024 |
| 2010/0264739 | A1* | 10/2010 | Errington | H02J 1/10 307/80 |
| 2014/0015324 | A1* | 1/2014 | Brennan | H02J 3/383 307/72 |
| 2016/0156197 | A1* | 6/2016 | Batzler | H02J 3/14 307/23 |
| 2016/0380413 | A1* | 12/2016 | Cruz | H02H 7/22 361/668 |
| 2018/0019593 | A1* | 1/2018 | Dent | H02J 3/383 |
| 2018/0131226 | A1* | 5/2018 | Narla | H02J 3/383 |

* cited by examiner

*Primary Examiner* — Hal Kaplan
*Assistant Examiner* — Rasem Mourad
(74) *Attorney, Agent, or Firm* — Omni Legal Group; Omid E. Khalifeh

(57) ABSTRACT

An assembly, system, and method for receiving, distributing, and monitoring electrical power received from one or more sources is characterized by a residential electrical panel having at least a main bus panel having one or more house load circuit breakers, a main circuit breaker, a first meter, and a battery output; a second bus panel having a battery input communicatively connected to the residential electrical panel and one or more critical load circuit breakers; one or more jumpers communicatively connecting the main bus panel to the second bus panel; a second meter communicatively connected to the monitoring device; a solar sub panel communicatively connected to the second meter; and a monitoring device communicatively connected to the residential panel, the solar sub panel, the second bus bar, and the second meter.

20 Claims, 3 Drawing Sheets

ASSEMBLY, SYSTEM AND METHOD FOR DISTRIBUTING, MONITORING, AND CONTROLLING ELECTRICAL POWER

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to electrical panels, and more particularly, to an electrical panel assembly adapted to receive and distribute electrical power to and from multiple sources, including but not limited to grid, solar, or battery power. In some embodiments, the present invention may comprise an assembly, system and method for distributing, monitoring, and controlling electrical power.

BACKGROUND

Traditionally, electrical power is generated by utility companies at a power plant and distributed to the location where the electricity is needed. The power plant as well as the collection of wires, transformers, towers, poles, and so forth required to transmit the electricity to its destination is collectively sometimes called a utility power grid, or "the grid."

Most power plants generate electrical power through three conversions: by converting potential energy to thermal energy, then thermal energy to mechanical energy, and finally mechanical energy to electrical energy through a heat engine, a turbine, and an electrical generator, respectively. More specifically, the heat engine burns a fuel to yield thermal energy, which transforms water into steam. The steam turns the turbine, generating mechanical energy. Then, the mechanical energy is used by the generator to turn a magnet within a loop of wire, producing electrical energy, or electricity. This electricity is then modified and distributed to an end user via wiring, transformers, and other elements of the grid.

The traditional model's heat engine consumes fossil fuels and harms the environment in the process. Most commonly the heat engine burns coal, oil, and natural gas, which consumes natural resources and creates pollution. In a nuclear power plant, a nuclear reactor generates heat by nuclear fission and produces radioactive waste.

In order to conserve fossil fuels and preserve the environment, engineers and others seek to create electrical power using "sustainable" power sources, or those that do not consume fossil fuels or create harmful byproducts. Most efforts are targeted at the heat engine step, but some (such as solar power) bypass the heat engine step altogether.

Presently, sustainable power sources supply power to the power grid, the home, and the consumer vehicle. At the power grid level, wind or water turbines harness the flow of wind and water to turn a turbine. At the home level, solar power ("solar," "solar energy," or "solar power" herein) uses one or more photovoltaic modules to transform light energy into electricity. Solar power is an increasingly appealing and feasible option. Additionally, batteries capable of powering a home for a short time ("battery power," "batteries," or "battery" herein) use reversible electrochemical reactions to store and provide electrical power as needed, which allows electrical power to be reused, rather than wasted or unnecessarily returned to the grid. At the vehicle level, electric vehicles utilize rechargeable batteries to power cars.

And yet, sustainable power sources have not yet replaced the grid for several reasons. For example, the availability of sunshine or wind is unpredictable. Additionally, in many cases an electrical vehicle's rechargeable battery provides far less usable power than a gas or diesel engine.

Therefore, many consumers seek to reduce their consumption of grid power while simultaneously utilizing sustainable power sources. This could involve mindful efforts such as turning off appliances when not in use, or installing power-consumption monitoring devices. An exemplary effort in this regard can be seen in the disclosure of U.S. Pat. No. 8,255,090, incorporated by reference in its entirety herein. Disclosures such as this provide for careful monitoring of electrical power consumption, as well as ways to limit such consumption. More specifically, monitoring devices such as provided in this disclosure connect to a power source and a power-consuming device in order to measure, monitor, and if necessary alter the power-consuming device's electrical power consumption. Unfortunately, this disclosure and others like it suffer from one or more shortcomings, such as an inadequate design for the present purpose.

Yet, supplementing grid power with sustainable power at the home level while also optimizing the home's electrical power consumption can create significant cost and feasibility problems. For example, a wind or water turbine is prohibitively large and overly expensive for most consumers, and solar power equipment can be large, bulky, and costly.

Additionally, sustainable power sources are associated with significant installation costs as well. These costs come in the form of equipment, labor, and time. With respect to equipment costs, solar and battery power often require independent sub panels, circuit breakers, wiring, and other associated elements. Additionally, both solar and battery power require power conversion equipment. Solar power produces, and battery power stores or releases, direct current (DC) electricity. However, most household appliances only utilize alternating current (AC) electricity. To meet this challenge, an inverter is necessary to convert DC electricity to AC electricity. Optimizing such inverters is therefore of high interest to the solar energy industry. An example of such optimization can be seen with respect to the disclosure of U.S. Patent Application Publication No. 2012/0281444 A1, incorporated by reference in its entirety herein. Even with such an inverter, however, some electricity-using devices still have difficulty utilizing converted solar power electricity.

With respect to labor and time costs, the homeowner has more choices. One option is to engage a professional electrician to install the solar or battery systems and thereby ensure the final installed product is safe. The electrician, however, may charge a high rate for service. Another option, favored by some consumers, is to avoid this cost and install solar or battery electrical power systems using the consumer's own time and resources. What often happens, however, is that the amateur electrician must often install solar sub panel systems or battery systems that require the user to manually switch the main residential panel to solar or battery power. In other words, while it may save labor cost to install solar or battery by one's self, the ongoing cost in time makes the process consistently burdensome.

What is needed is an assembly, system, and method that distributes, monitors, and controls electrical power to and from one or more homes by providing for 1) a plurality of interconnected solar, grid, and battery electrical power systems and sources, 2) a monitoring device that connects these systems and sources and that automates, monitors, and manages the home(s)' electrical power usage, and 3) a configuration that lowers labor costs and delivers an aesthetically pleasing visual effect.

Some other proposals for such an assembly, system, and/or method have been made. One example is U.S. Pat. No. 8,700,224 to Mathiowetz, the disclosure of which is incorporated in its entirety by reference herein. This disclosure generally provides for a single-point plug in system that utilizes a Meter Jumper Plug and a Meter Jumper Panel to accept and distribute electricity from extra-grid sources such as solar power into an existing main service panel at a home or small business. While this disclosure does provide for several advantageous features, such as IP networking capabilities that can turn individual appliances on or off and that can manage overall demand for electricity during peak demand periods, this disclosure unfortunately discloses an unwieldy retrofit installation process wherein the original electric meter must be removed and a Meter Jumper Plug installed in its place.

Another attempt can be seen with respect to U.S. Patent Application Publication No. 2010/0264739 A1 filed by Errington, the disclosure of which is incorporated by reference in its entirety herein. This disclosure generally provides for a modular power management system that may be wall mounted and configured to allow a homeowner to plug in and manage various electrical power sources via a backplane that accepts the electrical power source connection and a main system microprocessor that manages and distributes the electrical power. While this disclosure does generally provide for a modular and adaptive electrical power management system that monitors electrical usage, it lacks a turnkey installation approach and generally lacks the ability to effectively optimize power usage from a remote location.

Yet another attempt can be seen with respect to U.S. Pat. No. 8,350,697 to Trundle et al., the disclosure of which is incorporated by reference in its entirety herein. This disclosure generally provides for a "smart" home electricity usage monitoring system that detects the presence of occupants who might use an appliance or other item powered by electricity, as well as records and optimizes the appliance or other item's overall electricity usage. This disclosure also generally provides for remote on/off functionality for individual items based on the home's electricity usage. While this disclosure generally provides for electrical optimization, it fails to provide for energy usage allotments based on contributions from alternative energy sources.

As such, these disclosures and others like them fail to provide for the beneficial characteristics described in the following disclosure. Thus, there remains a need for an assembly, system and method that provides for distributing, monitoring and controlling electrical power.

SUMMARY

The present disclosure is directed to an assembly, system and method for distributing, monitoring and controlling electrical power, in addition to other properties.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In certain embodiments, the assembly comprises a residential electrical panel in communicative contact with one or more of a proprietary monitoring device, a solar sub panel, a battery and an electric vehicle charging station. It is contemplated that in some embodiments, the elements comprising the present invention may be installed over the span of one installation period. In other embodiments, it is contemplated that the various elements comprising the present invention may be installed as needed or at different times. In some embodiments, it is contemplated that the various elements comprising the present invention may be installed as part of new construction. In some embodiments, it is contemplated that the various elements comprising the present invention may be installed as a retrofit.

In some embodiments, the present invention may provide for a residential electrical panel that may comprise a main circuit breaker, a first meter and a main bus bar having one or more house load circuit breakers. Additionally, in some embodiments, the residential electrical panel may further comprise one or more neutral portions, one or more ground portions, and a battery output terminal.

In some embodiments, the present invention may also provide for a solar sub panel. In turn, the solar sub panel may provide for one or more solar bus bars, one or more solar inverters, and one or more solar circuit breakers fixed to or within the solar bur bar, as well as a meter dedicated to the solar subpanel. The solar sub panel may be connected to a second bus bar, which may provide for one or more critical load centers and one or more critical load breakers. In some embodiments, one or more jumpers may communicatively connect the second bus bar and the main bus bar.

The present invention may also provide for one or more batteries. In various embodiments, a range of batteries may be provided that store and release electrical power. The batteries contemplated may range from batteries capable of only powering a portion of the home for a small amount of time to batteries capable of powering an entire home for an extended period of time. In some embodiments, the battery may be connected to the main bus bar via a battery output wire and to the second bus bar via a battery input wire.

In some embodiments, the present invention may also provide for an electric vehicle charging station. It is contemplated that the electric vehicle charging station may be wired into the main bus bar. Additionally, in some embodiments, one or more circuit breakers on the main bus bar may be dedicated to the electric vehicle charging station.

In some embodiments, the present invention may also provide for a monitoring device that may be configured to perform at least the tasks of measuring energy consumption, controlling home energy usage, and coordinating or controlling the home's electrical supply systems. In some embodiments, the monitoring device may be connected to the internet a user interface affixed to a home, one or more mobile devices, one or more energy management systems, one or more EPCEs, and one or more elements of the present invention. Such connections may be wired, wireless, constant, periodic, on-demand, encrypted, unencrypted, stored in a temporary data storage element, not stored in a permanent data storage element, stored in a permanent data storage element, or not stored in a permanent data storage element, or take any form or aspect known in the pertinent art.

In order to measure home energy consumption, the monitoring device may monitor, record, and evaluate the manner in which a home's electrical power-consuming elements ("EPCEs") utilize electrical power. In so doing, in some embodiments, the monitoring device may evaluate one or more factors such as by way of illustration and not limitation, one or more EPCEs' load(s) consumption. In some embodiments, the monitoring device may compare such information against standards such as the EPCE's past use or the average use for an equivalent EPCE in a particular area. In some embodiments, the monitoring device may determine which EPCEs are over-using or under-using electrical power. In some embodiments, the monitoring device may also generate warnings, to either a user or a third party, or both, if the monitoring device determines that the EPCE is over-using or under-using electrical power.

In order to control home energy usage, the monitoring device may control one or more aspects of a home's electrical power supply and usage. By way of illustration and not limitation, the monitoring device may control which source or mix of sources of electrical power (grid, solar, battery, or electric vehicle) is used at a given time to power one or more EPCEs or the home. Also, the monitoring device may control which breakers may conduct electrical power at a given time, such as house load circuit breakers, critical load circuit breakers, or both. As well, the monitoring device may begin, speed up, slow down, or cease electrical power supply to one or more EPCEs. Furthermore, the monitoring device, through any communication medium known in the art whether wired or wireless, may begin, speed up, slow down, or cease one or more EPCEs' electrical power usage. It is also contemplated that the monitoring device may be configured to accomplish any aspect of electrical-power-based home automation known to those of skill in the art.

In some embodiments, the monitoring device may change or initiate the electrical power usage of a home or one or more EPCEs in response to a schedule, a condition, or instructions. For example, with respect to scheduled changes, the monitoring device may cause changes to a home's EPCEs based on time of day. In such an example, the monitoring device may cause certain EPCEs such as an air conditioner to consume electrical power differently at night than during the day. Or, the monitoring device may cause grid power to flow to one or more solar photovoltaic modules to initiate their startup, then cease the flow of grid power once the solar photovoltaic modules begin generating electricity. With respect to conditional changes, for example in the condition of a power outage, the monitoring device may cause electrical power to flow from a battery through the critical load circuits only. Or in the condition of a high electricity usage for the month, the monitoring device may cause EPCEs to consume less electrical power or be active for shorter periods of time. With respect to changes in response to instructions, the monitoring device may receive instructions from a user, a third party, the internet, or a computer program to change the electrical power consumption or supply of a home or one or more EPCEs. For example, via either a mounted interface or one or more user devices, such as a mobile phone, smartphone, tablet, or personal computer, a user may cause the monitoring device to switch an EPCE or the home from grid power to solar power. Additionally, in some embodiments, utility companies, neighborhood associations, other users' monitoring devices, government agencies, or other third parties may communicate directly with the monitoring device to cause changes to a home or an EPCE's electrical power consumption and/or supply. In some embodiments, the monitoring device may implement these instructions immediately, on a delay, according to a schedule, or in response to a condition or activating circumstance. By controlling one or more, or all, aspects of a home's electrical supply and usage, in some embodiments the monitoring device may provide users with partial or total home automation.

Remaining with the monitoring device, in some embodiments the monitoring device may also coordinate the home's electrical supply systems. In some embodiments, the present invention may interface with processors that may be connected to an electrical battery, a solar power system, or an electrical vehicle. In some embodiments, the monitor may also interface with the grid or a neighborhood electrical power system. For example, it is contemplated that should more than one home in a community implement the present invention, the present invention may provide that in certain situations, such as an emergency, the users may share electrical power between the houses as needed. Additionally, the monitoring device may interface with additional or aftermarket elements installed by a homeowner, such as an additional battery or photovoltaic modules not part of the present invention. In such a circumstance, the monitoring device may enable those other systems to feed into or otherwise work with the present invention.

In some embodiments, the elements of the present invention may be configured so as to align closely and neatly. The elements of the present invention may also be configured to enable quick and easy installation. The monitor may be configured to measure energy consumption, control home energy usage, and coordinate or control the home's electrical supply systems. As such, it is an object of the present invention to solve user problems associated with aesthetics, installation, energy monitoring, energy consumption, and electrical supply device management.

Additionally, the present invention may provide for one or more small currency transformers, as well as "smart" breakers, or individual "smart" elements that may patch into or otherwise work with the present invention. It is therefore contemplated that the present invention may incorporate other electrical panel elements that may be known to those of skill in the art both at present and in the future.

In some embodiments, the present invention may provide for an assembly comprising a residential electrical panel comprising a utility connection, which may be electrically connected to a first meter, which may be electrically connected to a main circuit breaker, which may be electrically connected to a main bus bar, which may be electrically connected to at least one house load circuit breaker, and a battery output terminal that may be electrically connected to the main bus bar. The assembly may also provide for a solar sub panel comprising a solar bus bar and at least one solar circuit breaker that may be electrically connected to the solar bus bar, a second meter that may be electrically connected to the solar bus bar, a second bus bar that may be electrically connected to the second meter, as well as at least one critical load circuit breaker that may be electrically connected to the second bus bar, a battery input terminal that may be electrically connected to the second bus bar, at least one jumper that may have a first end and a second end, wherein the first end may be electrically connected to the main bus bar and the second end may be electrically connected to the second bus bar, a battery electrically connected to the battery input terminal and the battery output terminal, and a monitoring device that may be electrically connected to the main bus bar, the main circuit breaker, the solar bus bar, the first meter, the second meter, the second bus bar, and the battery. In some embodiments, the assembly may further comprise an electric vehicle charging station that may be connected to the main bus bar. In some embodiments, the at least one house load circuit breaker may be dedicated to the electric vehicle charging station. Additionally, in some embodiments, the second bus panel may be configured as a critical load center. In some embodiments, the assembly may further comprise at least one solar inverter connected to the solar sub panel. In some embodiments, the assembly may further comprise at least one photovoltaic module connected to the solar sub panel.

In some embodiments, the present invention may provide for a system for distributing, monitoring, and controlling electrical power, comprising an electrical device operable to monitor electrical power usage data captured by at least one measuring element that measure attributes relevant to electrical power usage by at least one electrical power consuming element, determine an electrical power usage profile for the at least one electrical power consuming element, monitor the status of at least one solar power source, at least one utility power source, and at least one battery power source, if necessary, control at least one behaviors of the at least one solar power source, the at least one utility power source, and the at least one battery power source, determine, based on the electrical power usage profile and the status of the at least one solar power source, the at least one utility power source, and the at least one battery power source, a ratio of electrical power to be distributed from the at least one solar power source, the at least one utility power source, and the at least one battery power source to the at least one electrical power consuming elements, and distribute electrical power to the at least one electrical power consuming element according to the ratio. Additionally, the electrical device may be operative to determine, based on the proper electrical power usage of the at least one electrical power consuming element, an amount of excess electrical power, determine at least one electrical power destination based on the status of the at least one utility power source, and the at least one battery power source, wherein the at least one of the at least one utility power source, and the at least one battery power source may be an electrical power destination, draw the excess electrical power from the at least one electrical power consuming element, an distribute the excess electrical power to the at least one electrical power destination.

The present invention may also provide for a method for distributing, monitoring, and controlling electrical power, comprising providing a residential electrical panel comprising a utility connection, the utility connection electrically connected to a first meter, the first meter electrically connected to a main circuit breaker, the main circuit breaker electrically connected to a main bus bar, the main bus bar electrically connected to at least one house load circuit breakers, and a battery output terminal electrically connected to the main bus bar, providing a solar sub panel comprising a solar bus bar and at least one solar circuit breaker electrically connected to the solar bus bar, providing a second meter electrically connected to the solar bus bar, providing a second bus bar electrically connected to the second meter, providing at least one critical load circuit breaker electrically connected to the second bus bar, providing a battery input terminal electrically connected to the second bus bar, providing at least one jumper, the at least one jumper having a first end and a second end, wherein the first end is electrically connected the main bus bar and the second end is electrically connected to the second bus bar, providing a battery, the battery electrically connected to the battery input terminal and the battery output terminal, and providing a monitoring device, the monitoring device electrically connected to the main bus bar, the main circuit breaker, the solar bus bar, the first meter, the second meter, the second bus bar, and the battery. In some embodiments, the method may further comprise the steps of connecting, using at least one wire, the utility connection, the first meter, the main circuit breaker, the main bus bar, the at least one house load circuit breaker, the battery output terminal, the solar bus bar, the at least one solar circuit breaker, the second meter, the at least one critical load circuit breaker, the battery input terminal, the at least one jumper, the battery, and the monitoring device.

The present disclosure may refer to a "house" or a "home." It is to be understood that these terms are herein intended to encompass any structure or object capable of practicing the present invention, such as by way of illustration and not limitation, an office building, a stadium, a car, or even, in some embodiments, a portable device.

Additionally, the present disclosure may refer to one or more electrical power-consuming elements ("EPCEs"). This term and others like it are herein intended to encompass any object capable of using or conducting electricity or electrical power, such as by way of illustration and not limitation, fixtures, appliances, outlets, items connected to wall socket wiring, lights, air conditioning units, heaters, or electronics.

Further, the present disclosure may refer to "monitor" or "monitoring." This term and others like it are herein intended to encompass the activities of tracking, measuring, recording, analyzing, evaluating, observing, and any similar or related activity.

Also, the present disclosure may refer to elements other than the monitoring device having one or more "control" or "controlling" functions. In such an instance, "control" or "controlling" as used herein may mean, at least, causing an element to undertake or refrain from undertaking an action. In some circumstances, this definition may apply to the monitoring device as well.

As used in the claims and in the specification, the term "activity" may herein mean, at least, the production, reception, conduction, or retention of electricity; actions such as powering on or off; as well as reporting, monitoring, measuring, or controlling functions. "Activity" may also refer to, by way of illustration and not limitation, a solar sub panel controlling the behavior of a photovoltaic panel or photovoltaic cell, a circuit breaker being turned on or off, or any other activity disclosed or implied herein in association with any element of the present invention.

Furthermore, terms such as "communicatively connected" or "communicatively coupled" and other terms used to describe connections between elements disclosed herein are to be understood as, at least, permitting the flow of electricity along the connection.

One or more of the above-disclosed embodiments, in addition to certain alternatives, are provided in further detail below with reference to the attached figures. The disclosed subject matter is not, however, limited to any particular embodiment disclosed.

Figure 1:
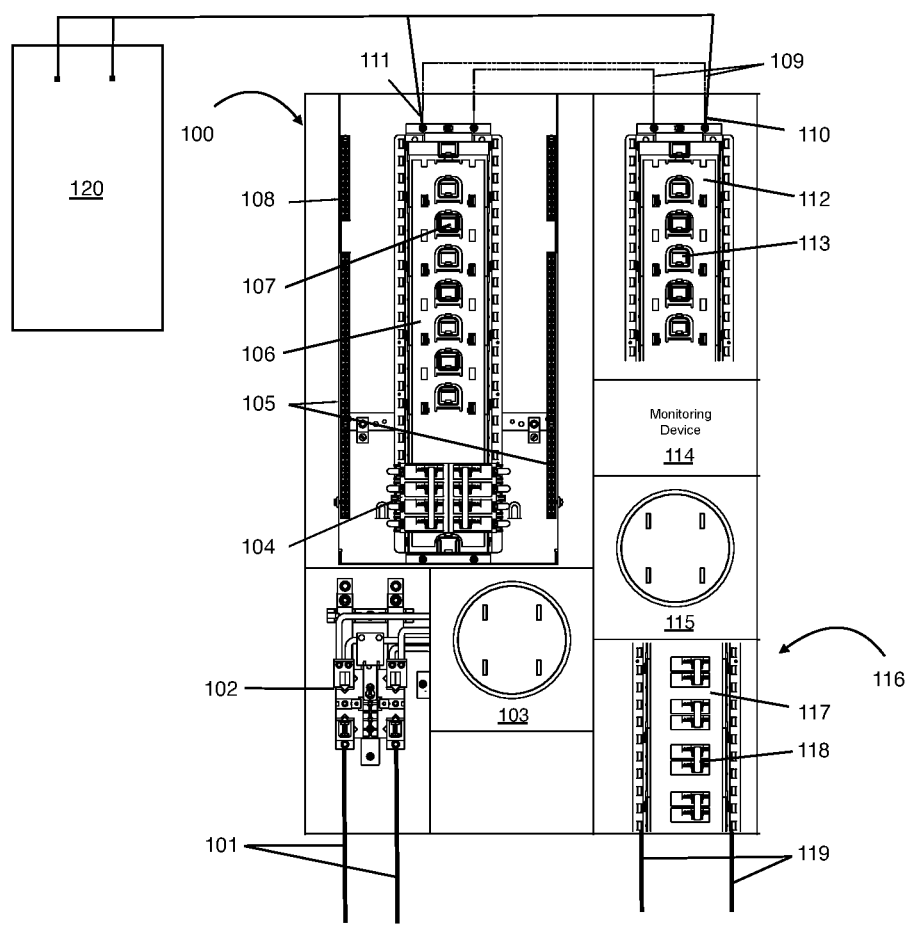
FIG. 1 shows a plan view of an embodiment of an assembly for distributing, monitoring, and controlling electrical power received from one or more sources in accordance with one embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or assembly that comprises a list of elements is not necessarily limited to those elements, but may include other elements not expressly listed or inherent to such process, method, system, article, device, or assembly.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

FIG. 1 illustrates an exemplary embodiment of the assembly for receiving, distributing, and monitoring electrical power received from one or more sources, wherein the embodiment may comprise residential panel 100, utility wires 101, utility connection 102, first meter 103, main circuit breaker 104, neutral portion 105, main bus bar 106, house load circuit breakers 107, ground portion 108, jumpers 109, battery input 110, battery output 111, second bus bar 112, critical load circuit breakers 113, monitoring device 114, second meter 115, solar sub panel 116, solar bus bar 117, solar circuit breakers 118, solar connection wires 119, battery 120, and electrical vehicle charging station (not pictured) which may be connected to one or more of house load circuit breakers 107.

In the embodiment depicted, various elements of the present invention are shown in one of many different configurations. It is contemplated that in some embodiments, the physical arrangement or configurations of one or more elements of the present invention may be positioned differently from the arrangement generally disclosed in FIG. 1.

As generally disclosed in FIG. 1, the present invention may distribute, monitor, and control electrical power from multiple sources. In one embodiment, electrical power from the grid may travel through utility wires 101 and utility connection 102, pass through first meter 103, and be received at main circuit breaker 104. If main circuit breaker 104 is in the on position, electrical power may flow to monitoring device 114 and then main bus bar 106. From main bus bar 106, electrical power may flow through one or more house load circuit breakers 107 in the on position to the appropriate location in the house. Additionally, electrical power may flow to or from main bus bar 106 via jumpers 109 to second bus bar 112. If one or more critical load circuit breakers 113 are in the on position, power may then flow into the appropriate location in the house. In some embodiments, electrical power may flow in reverse from the house to the solar sub panel 116. In some embodiments, electrical power may flow in reverse from the house to the grid. In some embodiments, electrical power may flow in reverse from the house to battery 120.

Continuing with FIG. 1, in some embodiments electrical power may be received by one or more photovoltaic modules or other form of photoelectric energy capture, and transmitted via solar connection wires 119 to solar circuit breakers 118, which may be located on solar bus bar 117, which may in turn be located within solar sub panel 116. In some embodiments, solar circuit breakers 118 may correspond to one or more branch circuits or one or more inverters. If one or more solar circuit breakers 118 are in the on position, electrical power may flow to the corresponding branch circuit or inverter and then into main circuit breaker 104, followed by monitoring device 114, main bus bar 106, one or more house load circuit breakers 107 in the on position, then to the appropriate location in the house. In some embodiments, electrical power may flow in reverse from the house to the solar sub panel 116. In some embodiments, electrical power may flow in reverse from the house to the grid. In some embodiments, electrical power may flow in reverse from the house to battery 120.

Remaining with FIG. 1, in some embodiments the present invention may also provide for battery 120. In these embodiments, electrical power may flow from main bus bar 106 to battery 120 via battery output 111. Power may then flow from battery 120 to second bus bar 112 via battery input 110. If one or more critical load circuit breakers 113 are in the on position, electrical power may then flow from second bus bar 112 to main bus bar 106 via jumpers 109 or via either battery input 110 or battery output 111. From main bus bar 106, electrical power may flow to monitoring device 114, back to main bus bar 106, then through house load circuit breakers 107 and into the house. In some embodiments, battery 120 may be connected to one or more electric vehicle charging stations. In some embodiments, electrical power may flow in reverse from the house to the solar sub panel 116. In some embodiments, electrical power may flow in reverse from the house to the grid. In some embodiments, electrical power may flow in reverse from the house to battery 120.

Additionally, FIG. 1 also discloses monitoring device 114. In some embodiments, monitoring device 107 may be communicatively connected with one or more elements of the present invention, including utility wires 101, utility connection 102, first meter 103, main circuit breaker 104, neutral portion 105, main bus bar 106, house load circuit breakers 107, ground portion 108, jumpers 109, battery input 110, battery output 111, second bus bar 112, critical load circuit breakers 113, monitoring device 114, second meter 115, a solar sub panel 116, solar bus bar 117, solar circuit breakers 118, solar connection wires 119, and battery 120.

Continuing with FIG. 1, monitoring device 114 may, among other functions, measure home energy consumption, control home energy usage, and coordinate or control, or both, the home's electrical supply systems. In some embodiments, monitoring device 114 may create or determine an electrical power usage profile for one or more EPCEs, wherein either an optimal, an ideal, an average, an adjusted, or otherwise determined level or manner of electrical power usage is ascertained in part or in whole. In some embodiments, monitoring device 114 may act as a hub to solar sub panel 116, grid 104, battery 120, and residential panel 100. It is contemplated that one or more series of connections may enable such a hub functionality, such as by way of illustration and not limitation, at least one connection between monitoring device 114 and solar power via solar sub panel 116; grid power via main circuit breaker 104; battery 120 via second bus bar 112; and residential panel 100, and consequently the house, via main bus bar 106.

Monitoring device 114 may measure home energy consumption using these connections, or one or more other connections between monitoring device 114 and any other element of the present invention. In some embodiments, monitoring device 114 may also or alternatively monitor electrical power use via direct communicative connection with one or more EPCEs, or through main circuit breaker 104, house load circuit breakers 107, critical load circuit breakers 113, or solar circuit breakers 118.

Monitoring device 114, in some embodiments, may also control a home's energy usage. As a hub to solar sub panel 116, the grid via main circuit breaker 104, battery 120 via second bus bar 112, and the house via main bus bar 106, monitoring device 114 may determine which source of electrical power (grid, solar, battery, or electric vehicle) is used at a given time.

In order to measure home energy consumption, the monitoring device 114 may monitor, record, and evaluate the manner in which electrical power is utilized by various EPCEs (not pictured). In some embodiments, monitoring device 114 may compare an EPCE's electrical power usage against standards such as the EPCE's past use or the average use for an equivalent EPCE in a particular area. In some embodiments, monitoring device 114 may determine which EPCEs are over-using or under-using electrical power. In some embodiments, monitoring device 114 may also generate warnings, to either a user or a third party, or both, if monitoring device 114 determines that the EPCE is over-using electrical power.

In order to control home energy usage, in some embodiments, monitoring device 114 may determine which source of electrical power (grid, solar, battery, or electric vehicle) is used at a given time to power the home. Such a choice may be made in advance, in response to one or more activated settings, or in response to a user or third party's input. If in advance, monitoring device 114 may utilize instructions or information derived from a user or the internet to schedule certain energy consumption choices, such as by way of illustration and not limitation, when to use battery, solar, or grid electrical power to power the home. By way of illustration and not limitation, monitoring device 114 may use grid (AC) power to start or run the photovoltaic modules (not pictured), which may power the home's usage for the day, and any excess power may be stored in battery 120. Then at night, monitoring device 114 may determine that battery 120 may provide electrical power to some or all of the home. If in response to one or more activated settings, the present invention may provide that certain events cause monitoring device 114 to engage one or more actions. For example, monitoring device 114 may be programmed to implement certain usage patterns in the event of a power outage, such as powering only EPCEs connected to critical load circuit breakers 113 or drawing power from battery 120 or an electrical vehicle via house load circuit breakers 107 or main circuit breaker 104 as applicable, if necessary. Monitoring device 114 may continue to make changes as more information or more triggering events take place. If in response to instructions or information derived from a user or the internet, monitoring device 114 may make immediately-implemented energy consumption choices, such as by way of illustration and not limitation, whether to use battery, solar, or grid electrical power to power the home or an EPCE. It is contemplated that either a user, a third party, or a program may cause monitoring device 114 to alter the flow, storage, or consumption of electrical power by entering instructions into a software application, or a physical interface such as a wall-mounted touchscreen, traditional thermostat, or "smart" thermostat (none pictured).

Additionally, in addition to controlling which power source is used to power the entire home, in some embodiments monitoring device 114 may modify the electrical power supply to one or more individual EPCEs, such as for example causing the electrical power supply to one or more EPCEs to slow down or cut off. In some embodiments, monitoring device 114 may interface with an EPCE directly via house load circuit breakers 107, causing the EPCE to reduce, cease, or enlarge its electrical power usage. In some embodiments, such determinations may be made in advance according to a schedule. For example, monitoring device 114 may cause an EPCE such as an air conditioner, via either house load circuit breakers 107 or critical load circuit breakers 113 as applicable, to operate less frequently at night. In some embodiments, such determinations may be made according to settings that may be activated by an event. Monitoring device 114, in some embodiments, may continue to make adjustments as more triggering events are reported to monitoring device 114. For example, in the event of a power outage, the present invention's monitoring device 114 may cause battery 120, via either house load circuit breakers 107 or critical load circuit breakers 113 as applicable, to power an EPCE such as a refrigerator or a main bedroom's lights, and when the outage is over may cause full power to return to the home via grid power as provided through residential panel 100 and its associated elements. In some embodiments, such determinations may be made per instructions that may be inputted into monitoring device 114 or other element of the present invention by a user, a third party, or both. By way of illustration and not limitation, the present invention may provide for one or more interfaces wherein a user may cause the monitoring device 114 to run a home or an EPCE according to a particular schedule, or the utility grid may communicate with monitoring device 114 and cause monitoring device 114 to cease using utility power.

In order to coordinate or control a home's electrical supply systems, in some embodiments monitoring device 114 may interface with the different processors associated with an electrical battery, a solar power system, or an electrical vehicle. By way of illustration and not limitation, such processors may be associated with the present invention's residential panel 100, battery 120, solar sub panel 116, or electric vehicle charging station (not pictured). In some embodiments, in addition to or in the alternative, monitoring device 114 may communicate with electrical power systems attached to or in communication with the present invention or elements of the present invention. In some embodiments, monitoring device 114 may also interface with the grid or a neighborhood electrical power system. For example, it is contemplated that should more than one home in a community implement the present invention, the present invention may provide that in certain situations, such as an emergency, the users may share electrical power between the houses as needed. Additionally, monitoring device 114 may interface with additional or aftermarket elements installed by a homeowner, such as an additional battery or photovoltaic modules not part of the present invention. In such a circumstance, monitoring device 114 may enable those other systems to feed into or otherwise work with the present invention.

In some embodiments, the present invention may also provide for a solar sub panel 116. In turn, the solar sub panel 116 may provide for at least one solar bus bar 117, one or more solar inverters (not pictured), and one or more solar circuit breakers 118 fixed to or within the solar bus bar 117, as well as solar connection wires 119. Additionally, solar bus bar may be connected to a second meter 115 dedicated to the solar sub panel 116. The solar sub panel 116 may also be connected to a second bus bar 112, which may provide for one or more critical load breakers 113. In some embodiments, one or more jumpers 109 may communicatively connect second bus bar 112 and main bus bar. Solar sub panel 116 may also be connected to battery 120 through second bus bar 112, or any other connection capable of supporting a connection between solar sub panel 116 and battery 120. It is contemplated that, in some embodiments, solar circuit breakers 118 may be used only for solar loads. In some embodiments, it is also contemplated that solar circuit breakers 118 may be used for additional or alternate loads than solar loads.

The present invention may also provide for at least one battery 120. In various embodiments, several different types of battery 120 may be provided that store and release electrical power to the home, the photovoltaic modules or solar sub panel 116, or to an electrical vehicle via house load circuit breakers 107 or main circuit breaker 104 as applicable. In some embodiments, battery 120 may be capable of only powering a portion of the home for a small amount of time, or capable only of turning on an element, such as a photovoltaic modules. In some embodiments, battery 120 may be capable of powering one or more entire homes for an extended period of time. It is contemplated that battery 120 may be any battery capable of storing and/or releasing electrical power in conjunction with the other elements of the present invention. In some embodiments, battery 120 may be connected to main bus bar 106 via battery output 111 and to second bus bar 112 via battery input 110. In some embodiments, battery 120 may provide AC current to the house or photovoltaic modules (not pictured) or the solar sub panel 116 when grid AC power is not available.

In some embodiments, the present invention may also provide for an electric vehicle charging station (not pictured). It is contemplated that the electric vehicle charging station may be wired into the main bus bar 106. Additionally, in some embodiments, one or more house load circuit breakers 107 on main bus bar 106 may be dedicated to the electric vehicle charging station. In some embodiments, one or more main circuit breaker 104 elements may be dedicated to the electric vehicle charging station. Through its connection to main bus bar 106, it is contemplated that electric vehicle charging station may receive or donate electrical power to or from the other elements of the present invention, including but not limited to solar, grid, or battery power. In some embodiments, monitoring device 114 may determine if and when electric vehicle charging station either receives or donates electrical power to or from the other elements of the present invention. By way of illustration and not limitation, one such situation could be wherein during an extended power outage, if battery 120 is drained, monitoring device 114 may draw power from, or cause another element of the present invention to draw power from, an electric vehicle via an electric vehicle charging station.

In certain embodiments, monitoring device 114 may provide for a display wherein a user may interface with monitoring device 114 and either learn data provided by monitoring device 114, actively control one or more features or functionalities of monitoring device 114, or both. In some embodiments, a user may remotely access monitoring device 114, to learn data as provided by monitoring device 114, actively control one or more features or functionalities of monitoring device 114, or both. In some embodiments, monitoring device 114 may automatically take certain actions as determined by either the programming of monitoring device 114 or by inputted instructions from a user, such actions including by way of illustration and not limitation, turning certain EPCEs on or off, or turning certain EPCE functions on or off.

In some embodiments, a user may interact with or control monitoring device 114 using one or more user devices via a smartphone, computer, tablet, watch, or any other device capable of interfacing with the present invention, via wireless, wired, Bluetooth, internet, or any other such form of communication between devices. Additionally, monitoring device 114 may also have a reporting function, wherein monitoring device 114 may send periodic updates of electrical usage to one or more users, or to a governmental agency, or to any receiving party appropriate for such communications.

Figure 2:
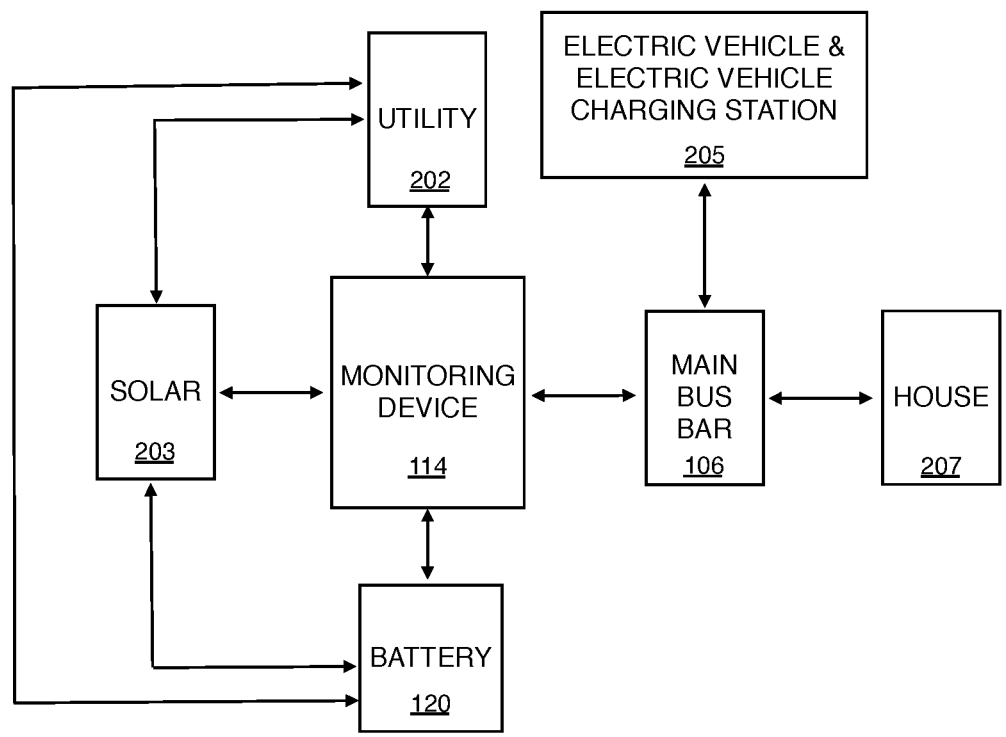
FIG. 2 shows a flowchart indicating an embodiment of a system for distributing, monitoring, and controlling electrical power received from one or more sources in accordance with one embodiment of the invention.

Turning attention to FIG. 2, an illustrative flowchart generally disclosing an embodiment of a system for distributing, monitoring, and controlling electrical power the present invention is shown. In the embodiment depicted, electrical power may flow in each direction between the elements of monitoring device 114, utility 202 (grid), solar 203, battery 120, and electric vehicle & electric vehicle charging station 205. In some embodiments, monitoring device 114 may determine what source of electrical power, or mix of sources of electrical power, may flow through main bus bar 106 and into house 207.

With respect to utility 202, electrical power may come from the grid, then feed into and be analyzed by the monitoring device 114, after which the electrical power may be passed on to main bus bar 106 and house 207. In some embodiments, monitoring device 114 may cause electrical power to flow in reverse from house 207 to the grid via utility 202.

With respect to solar 203, electrical power may be captured at photovoltaic modules or other photoelectric elements, then feed into and be analyzed by the monitoring device 114, after which the electrical power may be passed on to main bus bar 106 and house 207. In some embodiments, monitoring device 114 may cause electrical power to flow in reverse from house 207 to solar 203, which in some embodiments may cause the electrical power to be stored by or otherwise affect the photovoltaic modules, photoelectric elements, solar sub panel 116, or other element commonly associated with solar 203 by those of skill in the art.

With respect to battery 120, electrical power may be stored in battery 120, then feed into main bus bar 106, whereupon the electrical power may pass to and be analyzed by the monitoring device 114, after which the electrical power may be passed back to main bus bar 106 and then house 207. In some embodiments, monitoring device 114 may cause electrical power to flow in reverse from house 207 to battery 120, which in some embodiments may be stored by battery 120.

With respect to electric vehicle & electric vehicle charging station 205, electrical power may be stored in electric vehicle & electric vehicle charging station 205, then feed into main bus bar 106, whereupon the electrical power may pass to and be analyzed by the monitoring device 114, after which the electrical power may be passed back to main bus bar 106 and then house 207. In some embodiments, monitoring device 114 may cause electrical power to flow in reverse from house 207 to electric vehicle & electric vehicle charging station 205, which in some embodiments may be stored by electric vehicle & electric vehicle charging station 205. In some embodiments, with respect to electric vehicle & electric vehicle charging station 205, electrical power may be stored in or drawn from a battery connected to an electric vehicle, a battery connected to an electric vehicle charging station, or both.

Figure 3:
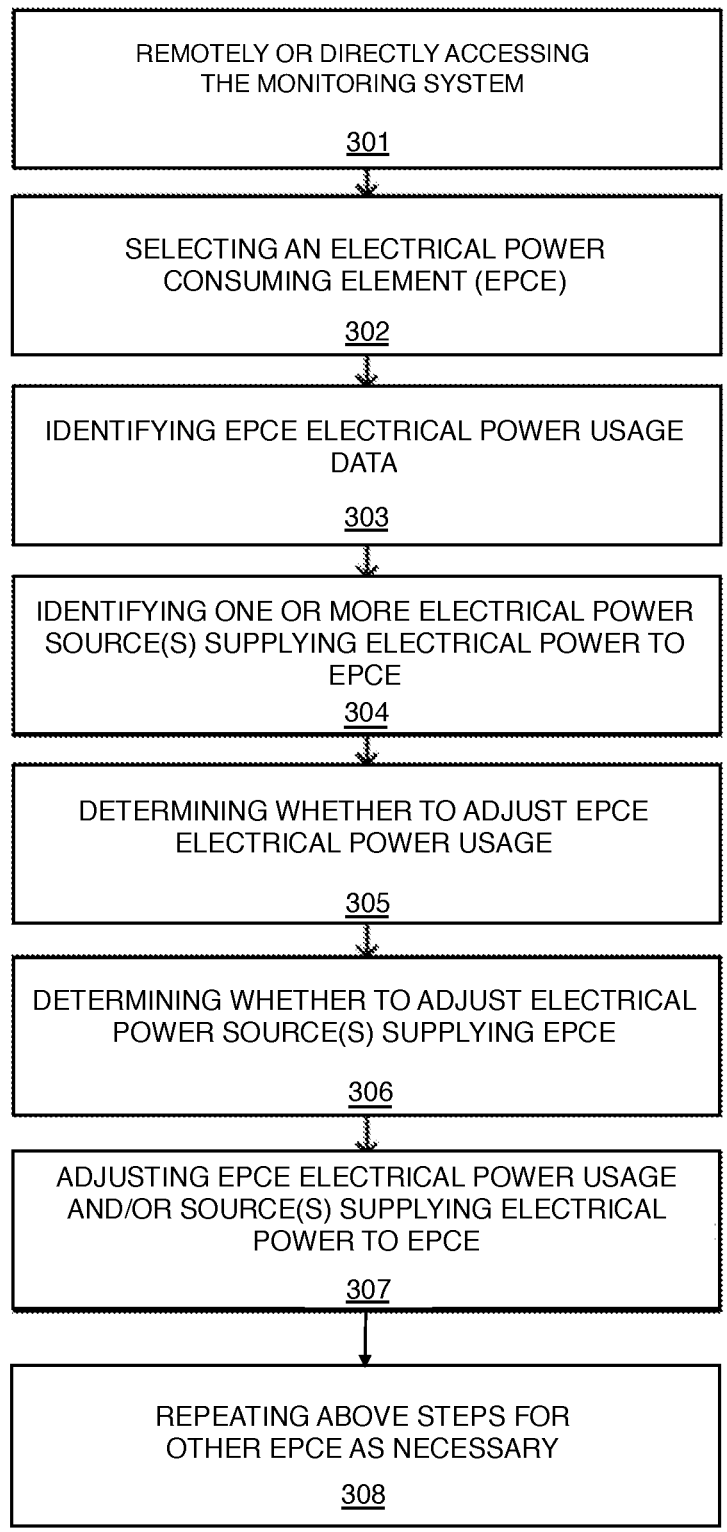
FIG. 3 is a flowchart depicting an exemplary embodiment of a method for distributing, monitoring, and controlling electrical power received from one or more sources in accordance with one embodiment of the invention.

FIG. 3 is a flowchart depicting one of many potential embodiments of a method for distributing, monitoring, and controlling electrical power received from one or more sources. The method shown in FIG. 3, includes at least the steps of: remotely or directly accessing the present invention's monitoring system 301, selecting an electrical power consuming element (EPCE) 302, identifying EPCE electrical power usage data 303, identifying one or more power sources supplying electrical power to the EPCE 304, determining whether to adjust EPCE electrical power usage 305, determining whether to adjust the electrical power source(s) serving the EPCE 306, adjusting EPCE electrical power usage and/or sources supplying electrical power to EPCE 307, repeating the above steps for all other EPCEs, as necessary 308.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the assembly, system and method for distributing, monitoring, and controlling electrical power with which that terminology is associated. In general, the terms used in the following claims should not be constructed to limit the assembly, system and method for distributing, monitoring, and controlling electrical power to the specific embodiments disclosed in the specification unless the above description section explicitly define such terms. Accordingly, the actual scope encompasses not only the disclosed embodiments, but also all equivalent ways of practicing or implementing the disclosed assembly, system and method for distributing, monitoring, and controlling electrical power. The above description of embodiments of assembly, system and method for distributing, monitoring, and controlling electrical power is not intended to be exhaustive or limited to the precise form disclosed above or to a particular field of usage.

While specific embodiments of, and examples for, an assembly, system and method for distributing, monitoring, and controlling electrical power are described above for illustrative purposes, various equivalent modifications are possible for which those skilled in the relevant art will recognize.

While certain aspects of an assembly, system and method for distributing, monitoring, and controlling electrical power are presented below in particular claim forms, various aspects of the assembly, system and method for distributing, monitoring, and controlling electrical power are contemplated in any number of claim forms. Thus, the inventor reserves the right to add additional claims after filing the application to pursue such additional claim forms for other aspects of the assembly, system and method for distributing, monitoring, and controlling electrical power.

What is claimed is:

1. An assembly, comprising:
at least one utility power panel comprising
(a) at least one utility connection;
(b) at least one first meter communicatively coupled to the utility connection;
(c) at least one main circuit breaker communicatively coupled to the at least one first meter;
(d) at least one main bus bar communicatively coupled to the main circuit breaker;
(e) at least one house load circuit breaker communicatively coupled to the main bus bar;
(f) at least one electrical power consuming element communicatively coupled to the main bus bar, and
(g) at least one battery output terminal communicatively coupled to the at least one main bus bar;
at least one sub panel, comprising:
(a) at least one additional bus bar;
(b) at least one circuit breaker communicatively coupled to the at least one additional bus bar;
(c) at least one additional meter communicatively coupled to the at least one additional bus bar;
(d) at least one second additional bus bar communicatively coupled to the at least one additional meter;
(e) at least one critical load circuit breaker communicatively coupled to the at least one additional bus bar;
(f) at least one jumper, the at least one jumper having a first end and a second end, wherein the first end is communicatively coupled to the at least one main bus bar and the second end is communicatively coupled to the at least one additional bus bar; and
at least one monitoring device configured to transmit any of energy consumption measurements, home energy usage measurements, and data defining home energy usage over the internet to one or more mobile electronic devices, the at least one monitoring device communicatively coupled to the at least one main bus bar, the at least one main circuit breaker, the at least one second additional bus bar, the at least one the first meter, and the at least one additional meter.

2. The assembly of claim 1, wherein the monitoring device is configured to monitor and control the electrical power usage of the at least one electrical power consuming element.

3. An assembly, comprising:
at least one utility power panel comprising
(a) at least one utility connection;
(b) at least one first meter communicatively coupled to the utility connection;
(c) at least one main circuit breaker communicatively coupled to the at least one first meter;
(d) at least one main bus bar communicatively coupled to the main circuit breaker;
(e) at least one house load circuit breaker communicatively coupled to the main bus bar;
(f) at least one electrical power consuming element communicatively coupled to the main bus bar; and
(g) at least one battery output terminal communicatively coupled to the at least one main bus bar;
at least one solar sub panel, comprising:
(g) at least one solar bus bar;
(h) at least one solar circuit breaker communicatively coupled to the at least one solar bus bar;
(i) at least one second meter communicatively coupled to the at least one solar bus bar;
(j) at least one second bus bar communicatively coupled to the at least one second meter;
(k) at least one critical load circuit breaker communicatively coupled to the at least one second bus bar;
(l) at least one battery input terminal communicatively coupled to the at least one second bus bar;
(m) at least one jumper, the at least one jumper having a first end and a second end, wherein the first end is communicatively coupled to the at least one main bus bar and the second end is communicatively coupled to the at least one second bus bar; and
at least one monitoring device, the at least one monitoring device communicatively coupled to the at least one main bus bar, the at least one main circuit breaker, the at least one solar bus bar, the at least one first meter, the at least one second meter, and the at least one second bus bar.

4. The assembly of claim 3, wherein the at least one second bus bar is configured as a critical load center.

5. The assembly of claim 3, further comprising at least one solar inverter connected to the at least one solar sub panel.

6. The assembly of claim 3, further comprising at least one photovoltaic module connected to the at least one solar sub panel.

7. The assembly of claim 3, wherein the monitoring device is configured to monitor and control one or more activities of the at least one utility power panel and one or more activities of the at least one solar sub panel.

8. The assembly of claim 3, wherein the monitoring device is configured to monitor and control the electrical power consumption by the at least one electrical power consuming element.

9. The assembly of claim 3, wherein the monitoring device is configured to monitor and control the supply of electrical power to the at least one electrical power consuming element, wherein the supply of electrical power is comprised of electrical power supplied by the utility power panel, electrical power supplied by the solar sub panel, or a mixture of both electrical power supplied by the utility power panel and electrical power supplied by the solar sub panel.

10. The assembly of claim 3, wherein the monitoring device is configured to monitor and control the electrical power distribution between the utility power panel and the solar sub panel.

11. An assembly, comprising:
at least one utility power panel comprising
(a) at least one utility connection;
(b) at least one first meter communicatively coupled to the utility connection;
(c) at least one main circuit breaker communicatively coupled to the at least one first meter;
(d) at least one main bus bar communicatively coupled to the main circuit breaker;
(e) at least one house load circuit breaker communicatively coupled to the main bus bar;
(f) at least one electrical power consuming element communicatively coupled to the main bus bar; and
(g) at least one battery output terminal communicatively coupled to the at least one main bus bar;
at least one solar sub panel, comprising:
(a) at least one solar bus bar;
(b) at least one solar circuit breaker communicatively coupled to the at least one solar bus bar;
(c) at least one second meter communicatively coupled to the at least one solar bus bar;
(d) at least one second bus bar communicatively coupled to the at least one second meter;

(e) at least one critical load circuit breaker communicatively coupled to the at least one second bus bar;
(f) at least one battery input terminal communicatively coupled to the at least one second bus bar;
(g) at least one jumper, the at least one jumper having a first end and a second end, wherein the first end is communicatively coupled to the at least one main bus bar and the second end is communicatively coupled to the at least one second bus bar;

at least one battery, the at least one battery communicatively coupled to the at least one battery input terminal and the at least one battery output terminal; and at least one monitoring device, the at least one monitoring device communicatively coupled to the at least one main bus bar, the at least one main circuit breaker, the at least one solar bus bar, the at least one first meter, the at least one second meter, and the at least one second bus bar.

12. The assembly of claim 11, further comprising:
at least one electric vehicle charging station, wherein the at least one electric vehicle charging station is connected to the at least one main bus bar.

13. The assembly of claim 11, wherein the at least one house load circuit breaker is dedicated to the at least one electric vehicle charging station.

14. The assembly of claim 11, wherein the at least one second bus bar is configured as a critical load center.

15. The assembly of claim 11, further comprising at least one solar inverter connected to the at least one solar sub panel.

16. The assembly of claim 11, further comprising at least one photovoltaic module connected to the at least one solar sub panel.

17. The assembly of claim 11, wherein the monitoring device is configured to monitor and control at least one activity of the at least one utility power panel, at least one activity of the at least one solar sub panel, and at least one activity of the at least one battery.

18. The assembly of claim 11, wherein the monitoring device is configured to monitor and control the electrical power consumption by the at least one electrical power consuming element.

19. The assembly of claim 11, wherein the monitoring device is configured to monitor and control the supply of electrical power to the at least one electrical power consuming element, wherein the supply of electrical power is comprised of electrical power supplied by the utility power panel, electrical power supplied by the solar sub panel, electrical power supplied by the battery, or a mixture of electrical power supplied by one or more of the utility power panel, electrical power supplied by the solar sub panel, or electrical power supplied by the battery.

20. The assembly of claim 11, wherein the monitoring device is configured to monitor and control the electrical power distribution between the utility power panel, the solar sub panel, and the battery.

* * * * *